US012745160B2

(12) United States Patent
Ma et al.

(10) Patent No.: US 12,745,160 B2
(45) Date of Patent: Sep. 22, 2026

(54) BEAM IDENTIFICATION AND SIMULTANEOUS SYNCHRONIZATION SIGNAL BLOCK TRANSMISSIONS FOR NETWORK DEVICE WITH MULTIPLE BEAMS

(71) Applicant: QUALCOMM Incorporated, San Diego, CA (US)

(72) Inventors: Liangping Ma, San Diego, CA (US); Huilin Xu, Temecula, CA (US); Xiao Feng Wang, San Diego, CA (US); Ayan Sengupta, San Diego, CA (US); Alberto Rico Alvarino, San Diego, CA (US); Bharat Shrestha, San Diego, CA (US); Jun Ma, San Diego, CA (US); Changhwan Park, San Diego, CA (US); Peter Gaal, San Diego, CA (US); Umesh Phuyal, San Diego, CA (US); Juan Montojo, San Diego, CA (US); Wanshi Chen, San Diego, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/565,405

(22) PCT Filed: Aug. 12, 2021

(86) PCT No.: PCT/CN2021/112203
§ 371 (c)(1),
(2) Date: Nov. 29, 2023

(87) PCT Pub. No.: WO2023/015514
PCT Pub. Date: Feb. 16, 2023

(65) Prior Publication Data

US 2024/0259917 A1 Aug. 1, 2024

(51) Int. Cl.
*H04W 48/10* (2009.01)
*H04L 5/00* (2006.01)

(52) U.S. Cl.
CPC ........... *H04W 48/10* (2013.01); *H04L 5/0051* (2013.01)

(58) Field of Classification Search
CPC .............. H04W 48/10; H04W 56/0015; H04L 5/0051; H04L 27/261; H04L 27/2655; H04L 5/0048; H04B 7/0695
(Continued)

(56) References Cited

U.S. PATENT DOCUMENTS

2019/0058620 A1 2/2019 Liu et al.
2019/0081827 A1 3/2019 Ly et al.
(Continued)

OTHER PUBLICATIONS

International Search Report and Written Opinion—PCT/CN2021/112203—ISA/EPO—May 9, 2022.

*Primary Examiner* — Hirdepal Singh
(74) *Attorney, Agent, or Firm* — Harrity & Harrity, LLP

(57) ABSTRACT

Various aspects of the present disclosure generally relate to wireless communication. In some aspects, a user equipment (UE) may determine a synchronization signal/physical broadcast channel (SS/PBCH) block index, associated with an SS/PBCH block, based at least in part on a set of bits included in a payload of a PBCH of the SS/PBCH block, a demodulation reference signal (DMRS) sequence included in the PBCH, a scrambling sequence associated with the PBCH, or an interleaving associated with the PBCH. Numerous other aspects are described.

18 Claims, 12 Drawing Sheets

(58) Field of Classification Search
USPC .......................................................... 455/434
See application file for complete search history.

(56) References Cited

U.S. PATENT DOCUMENTS

2019/0327696 A1 10/2019 Oh et al.
2020/0037230 A1* 1/2020 Chen .................... H04J 11/0073
2020/0067755 A1* 2/2020 Pan ....................... H04L 5/0048
2020/0336158 A1 10/2020 Uesaka et al.
2021/0045144 A1* 2/2021 Kim ...................... H04L 5/0053
2021/0136712 A1* 5/2021 Park ...................... H04L 5/0051
2024/0163682 A1* 5/2024 Si .......................... H04W 16/14

* cited by examiner

500

700

BEAM IDENTIFICATION AND SIMULTANEOUS SYNCHRONIZATION SIGNAL BLOCK TRANSMISSIONS FOR NETWORK DEVICE WITH MULTIPLE BEAMS

CROSS-REFERENCE TO RELATED APPLICATION

This Patent Application is a 371 National Stage of Patent Cooperation Treaty (PCT) Patent Application No. PCT/CN2021/112203, filed on Aug. 12, 2021, entitled "BEAM IDENTIFICATION AND SIMULTANEOUS SYNCHRONIZATION SIGNAL BLOCK TRANSMISSIONS FOR A NETWORK DEVICE WITH MULTIPLE BEAMS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam identification and simultaneous synchronization signal block transmissions for a network device with multiple beams.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include receiving a synchronization signal/physical broadcast channel (SS/PBCH) block. The method may include determining an SS/PBCH block index, associated with the SS/PBCH block, based at least in part on at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE, or an interleaving associated with the PBCH, the interleaving being from a set of possible interleavings for the UE.

Some aspects described herein relate to a method of wireless communication performed by a base station. The method may include generating an SS/PBCH block, wherein an SS/PBCH block index associated with the SS/PBCH block is indicated via at least one of: a set of bits included in a payload of a PBCH of the SS/PBCH block, the set of bits including: at least a first number of bits when a frequency of operation is at or below 6 GHz, or at least a second number of bits when the frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE, or an interleaving associated with the PBCH, the interleaving being from a set of possible interleavings for the UE. The method may include transmitting the SS/PBCH block.

Some aspects described herein relate to a method of wireless communication performed by a UE. The method may include receiving a first SS/PBCH block. The method may include receiving a second SS/PBCH block. The method may include determining, based at least in part on a time gap between the first SS/PBCH block and the second SS/PBCH block, that the first SS/PBCH block and the second SS/PBCH block are included in an SS/PBCH block group. The method may include determining an SS/PBCH block group index, associated with the SS/PBCH block group, based at least in part on a first SS/PBCH block index associated with the first SS/PBCH block and a second SS/PBCH block index associated with the second SS/PBCH block.

Some aspects described herein relate to a method of wireless communication performed by a base station. The method may include transmitting a first SS/PBCH block of an SS/PBCH block group, the first SS/PBCH block indicating a first SS/PBCH block index. The method may include transmitting a second SS/PBCH block of the SS/PBCH block group, the second SS/PBCH block indicating a second SS/PBCH block index, where a time gap between the first SS/PBCH block and the second SS/PBCH block indicates that the first SS/PBCH block and the second SS/PBCH block are included in the SS/PBCH block group, and where an SS/PBCH block group index associated with the SS/PBCH block group is indicated via the first SS/PBCH block index and the second SS/PBCH block index.

Some aspects described herein relate to a method of wireless communication performed by a base station. The method may include transmitting a first SS/PBCH block. The method may include transmitting a second SS/PBCH block, the second SS/PBCH block being transmitted simultaneously with the first SS/PBCH block, where the second SS/PBCH block is spatially separated from the first SS/PBCH block.

Some aspects described herein relate to a UE for wireless communication. The user equipment may include a memory and one or more processors coupled to the memory. The one or more processors may be configured to receive an SS/PBCH block. The one or more processors may be configured to determine an SS/PBCH block index, associated with the SS/PBCH block, based at least in part on at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE, or an interleaving associated with the PBCH, the interleaving being from a set of possible interleavings for the UE.

Some aspects described herein relate to a base station for wireless communication. The base station may include a memory and one or more processors coupled to the memory. The one or more processors may be configured to generate an SS/PBCH block, wherein an SS/PBCH block index associated with the SS/PBCH block is indicated via at least one of: a set of bits included in a payload of a PBCH of the SS/PBCH block, the set of bits including: at least a first number of bits when a frequency of operation is at or below 6 GHz, or at least a second number of bits when the frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE, or an interleaving associated with the PBCH, the interleaving being from a set of possible interleavings for the UE. The one or more processors may be configured to transmit the SS/PBCH block.

Some aspects described herein relate to a UE for wireless communication. The UE may include a memory and one or more processors coupled to the memory. The one or more processors may be configured to receive a first SS/PBCH block. The one or more processors may be configured to receive a second SS/PBCH block. The one or more processors may be configured to determine, based at least in part on a time gap between the first SS/PBCH block and the second SS/PBCH block, that the first SS/PBCH block and the second SS/PBCH block are included in an SS/PBCH block group. The one or more processors may be configured to determine an SS/PBCH block group index, associated with the SS/PBCH block group, based at least in part on a first SS/PBCH block index associated with the first SS/PBCH block and a second SS/PBCH block index associated with the second SS/PBCH block.

Some aspects described herein relate to a base station for wireless communication. The base station may include a memory and one or more processors coupled to the memory. The one or more processors may be configured to transmit a first SS/PBCH block of an SS/PBCH block group, the first SS/PBCH block indicating a first SS/PBCH block index. The one or more processors may be configured to transmit a second SS/PBCH block of the SS/PBCH block group, the second SS/PBCH block indicating a second SS/PBCH block index, where a time gap between the first SS/PBCH block and the second SS/PBCH block indicates that the first SS/PBCH block and the second SS/PBCH block are included in the SS/PBCH block group, and where an SS/PBCH block group index associated with the SS/PBCH block group is indicated via the first SS/PBCH block index and the second SS/PBCH block index.

Some aspects described herein relate to a base station for wireless communication. The base station may include a memory and one or more processors coupled to the memory. The one or more processors may be configured to transmit a first SS/PBCH block. The one or more processors may be configured to transmit a second SS/PBCH block, the second SS/PBCH block being transmitted simultaneously with the first SS/PBCH block, where the second SS/PBCH block is spatially separated from the first SS/PBCH block.

Some aspects described herein relate to a non-transitory computer-readable medium that stores a set of instructions for wireless communication by a UE. The set of instructions, when executed by one or more processors of the UE, may cause the UE to receive an SS/PBCH block. The set of instructions, when executed by one or more processors of the UE, may cause the UE to determine an SS/PBCH block index, associated with the SS/PBCH block, based at least in part on at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE, or an interleaving associated with the PBCH, the interleaving being from a set of possible interleavings for the UE.

Some aspects described herein relate to a non-transitory computer-readable medium that stores a set of instructions for wireless communication by a base station. The set of instructions. when executed by one or more processors of the base station, may cause the base station to generate an SS/PBCH block, wherein an SS/PBCH block index associated with the SS/PBCH block is indicated via at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE, or an interleaving associated with the PBCH, the interleaving being from a set of possible interleavings for the UE. The set of instructions, when executed by one or more processors of the base station, may cause the base station to transmit the SS/PBCH block.

Some aspects described herein relate to a non-transitory computer-readable medium that stores a set of instructions for wireless communication by a UE. The set of instructions, when executed by one or more processors of the UE, may cause the UE to receive a first SS/PBCH block. The set of instructions, when executed by one or more processors of the SS/PBCH block, may cause the UE to receive a second SS/PBCH block. The set of instructions, when executed by one or more processors of the UE, may cause the UE to determine, based at least in part on a time gap between the first SS/PBCH block and the second SS/PBCH block, that the first SS/PBCH block and the second SS/PBCH block are included in an SS/PBCH block group. The set of instructions, when executed by one or more processors of the UE, may cause the UE to determine an SS/PBCH block group index, associated with the SS/PBCH block group, based at least in part on a first SS/PBCH block index associated with the first SS/PBCH block and a second SS/PBCH block index associated with the second SS/PBCH block.

Some aspects described herein relate to a non-transitory computer-readable medium that stores a set of instructions for wireless communication by a base station. The set of instructions, when executed by one or more processors of the base station, may cause the base station to transmit a first SS/PBCH block of an SS/PBCH block group, the first SS/PBCH block indicating a first SS/PBCH block index. The set of instructions, when executed by one or more processors of the base station, may cause the base station to transmit a second SS/PBCH block of the SS/PBCH block group, the second SS/PBCH block indicating a second SS/PBCH block index, where a time gap between the first SS/PBCH block and the second SS/PBCH block indicates that the first SS/PBCH block and the second SS/PBCH block are included in the SS/PBCH block group, and where an SS/PBCH block group index associated with the SS/PBCH block group is indicated via the first SS/PBCH block index and the second SS/PBCH block index.

Some aspects described herein relate to a non-transitory computer-readable medium that stores a set of instructions for wireless communication by a base station. The set of instructions, when executed by one or more processors of the base station, may cause the base station to transmit a first SS/PBCH block. The set of instructions, when executed by one or more processors of the base station, may cause the base station to transmit a second SS/PBCH block, the second SS/PBCH block being transmitted simultaneously with the first SS/PBCH block, where the second SS/PBCH block is spatially separated from the first SS/PBCH block.

Some aspects described herein relate to an apparatus for wireless communication. The apparatus may include means for receiving an SS/PBCH block. The apparatus may include means for determining an SS/PBCH block index, associated with the SS/PBCH block, based at least in part on at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE, or an interleaving associated with the PBCH, the interleaving being from a set of possible interleavings for the UE.

Some aspects described herein relate to an apparatus for wireless communication. The apparatus may include means for generating an SS/PBCH block, wherein an SS/PBCH block index associated with the SS/PBCH block is indicated via at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE, or an interleaving associated with the PBCH, the interleaving being from a set of possible interleavings for the UE. The apparatus may include means for transmitting the SS/PBCH block.

Some aspects described herein relate to an apparatus for wireless communication. The apparatus may include means for receiving a first SS/PBCH block. The apparatus may include means for receiving a second SS/PBCH block. The apparatus may include means for determining, based at least in part on a time gap between the first SS/PBCH block and the second SS/PBCH block, that the first SS/PBCH block and the second SS/PBCH block are included in an SS/PBCH block group. The apparatus may include means for determining an SS/PBCH block group index, associated with the SS/PBCH block group, based at least in part on a first SS/PBCH block index associated with the first SS/PBCH block and a second SS/PBCH block index associated with the second SS/PBCH block.

Some aspects described herein relate to an apparatus for wireless communication. The apparatus may include means for transmitting a first SS/PBCH block of an SS/PBCH block group, the first SS/PBCH block indicating a first SS/PBCH block index. The apparatus may include means for transmitting a second SS/PBCH block of the SS/PBCH block group, the second SS/PBCH block indicating a second SS/PBCH block index, where a time gap between the first SS/PBCH block and the second SS/PBCH block indicates that the first SS/PBCH block and the second SS/PBCH block are included in the SS/PBCH block group, and where an SS/PBCH block group index associated with the SS/PBCH block group is indicated via the first SS/PBCH block index and the second SS/PBCH block index.

Some aspects described herein relate to an apparatus for wireless communication. The apparatus may include means for transmitting a first SS/PBCH block. The apparatus may include means for transmitting a second SS/PBCH block, the second SS/PBCH block being transmitted simultaneously with the first SS/PBCH block, where the second SS/PBCH block is spatially separated from the first SS/PBCH block.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
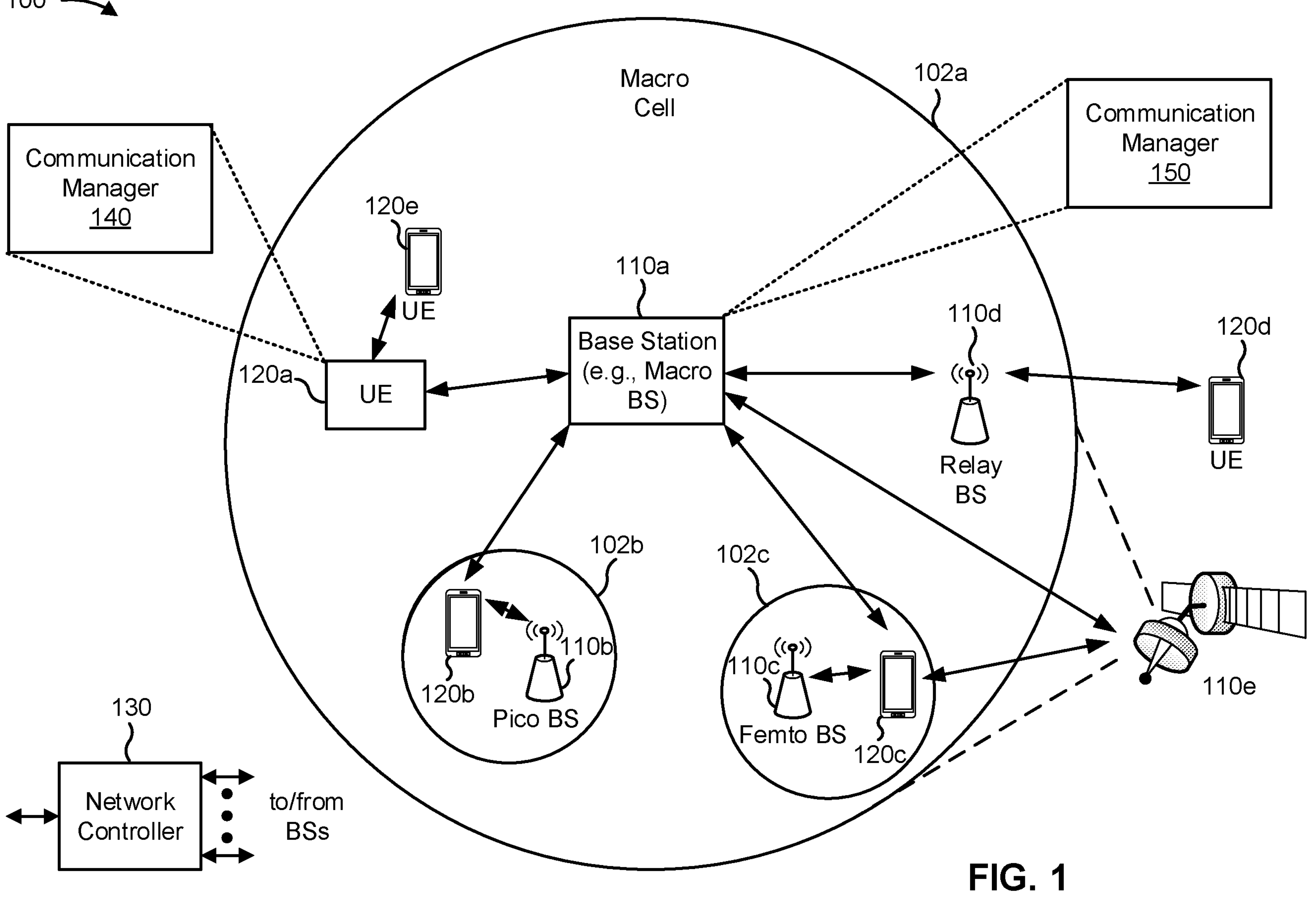
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, a BS 110*d*, and a BS 110*e*), a user equipment (UE) 120 or multiple UEs 120 (shown as a UE 120*a*, a UE 120*b*, a UE 120*c*, a UE 120*d*, and a UE 120*c*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

In some examples, as indicated in FIG. 1, a cell may be provided by a base station 110 of a non-terrestrial network (NTN). Such a base station 110 may also referred to as a non-terrestrial base station 110 or a non-terrestrial access point. As used herein, "NTN" may refer to a network for which access is provided by or assisted by a non-terrestrial base station 110. In some NTN deployments, a non-terrestrial base station 110 may be located on an airborne platform or a platform in orbit. Examples of such platforms include a satellite (e.g., a low earth orbit (LEO) satellite, a medium earth orbit (MEO) satellite, a geostationary earth orbit (GEO) satellite, or the like), a balloon, a dirigible, an airplane, an unmanned aerial vehicle (UAV), a drone, or the like.

In some NTN deployments (e.g., sometimes referred to as a transparent architecture or a bent pipe architecture), a non-terrestrial base station 110 may act as a relay station to relay communications between a UE 120 and a terrestrial base station 110 (e.g., a base station 110 located on the ground or on a tower). In this case, the non-terrestrial base station 110 may perform, for example, frequency translation and/or radio frequency amplification for communications relayed between the UE 120 and a terrestrial base station 110. For example, the UE 120 may transmit an uplink communication to the non-terrestrial base station 110, which may relay the uplink communication to a terrestrial base station 110 (e.g., after performing frequency translation, radio frequency amplification, and/or the like). The terrestrial base station 110 may perform additional processing on the uplink communication and/or may transmit the uplink communication to a core network. As another example, the terrestrial base station 110 may transmit a downlink communication to the non-terrestrial base station 110, which may relay the downlink communication to the UE 120 (e.g., after performing frequency translation, radio frequency amplification, and/or the like). In some aspects, a UE 120 and/or the terrestrial base station 110 may be referred to as a ground station (GS).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an SS/PBCH block, and determine an SS/PBCH block index, associated with the SS/PBCH block, based at least in part on at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE 120, or an interleaving associated with the PBCH, the interleaving being from a set of possible interleavings for the UE 120. Additionally, or alternatively, the communication manager 140 may perform one or more other operations described herein.

In some aspects, the base station 110 may include a communication manager 150. As described in more detail elsewhere herein, the communication manager 150 may generate an SS/PBCH block, wherein an SS/PBCH block index associated with the SS/PBCH block is indicated via at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE 120, or an interleaving associated with the PBCH, the interleaving being from a set of possible interleavings for the UE 120; and transmit the SS/PBCH block. Additionally, or alternatively, the communication manager 150 may perform one or more other operations described herein.

In some aspects, the UE 120 may include a communication manager 140. As described in more detail elsewhere herein, the communication manager 140 may receive a first SS/PBCH block; receive a second SS/PBCH block; determine, based at least in part on a time gap between the first SS/PBCH block and the second SS/PBCH block, that the first SS/PBCH block and the second SS/PBCH block are included in an SS/PBCH block group; and determine an SS/PBCH block group index, associated with the SS/PBCH block group, based at least in part on a first SS/PBCH block index associated with the first SS/PBCH block and a second SS/PBCH block index associated with the second SS/PBCH block. Additionally, or alternatively, the communication manager 140 may perform one or more other operations described herein.

In some aspects, the base station 110 may include a communication manager 150. As described in more detail elsewhere herein, the communication manager 150 may transmit a first SS/PBCH block of an SS/PBCH block group, the first SS/PBCH block indicating a first SS/PBCH block index; and transmit a second SS/PBCH block of the SS/PBCH block group, the second SS/PBCH block indicating a second SS/PBCH block index, wherein a time gap between the first SS/PBCH block and the second SS/PBCH block indicates that the first SS/PBCH block and the second SS/PBCH block are included in the SS/PBCH block group, and wherein an SS/PBCH block group index associated with the SS/PBCH block group is indicated via the first SS/PBCH block index and the second SS/PBCH block index. Additionally, or alternatively, the communication manager 150 may perform one or more other operations described herein.

In some aspects, the base station 110 may include a communication manager 150. As described in more detail elsewhere herein, the communication manager 150 may transmit a first SS/PBCH block; and transmit a second SS/PBCH block, the second SS/PBCH block being transmitted simultaneously with the first SS/PBCH block, wherein the second SS/PBCH block is spatially separated from the first SS/PBCH block. Additionally, or alternatively, the communication manager 150 may perform one or more other operations described herein.

As indicated above, FIG. 1 is provided as an example. Other examples may differ from what is described with regard to FIG. 1.

Figure 2:
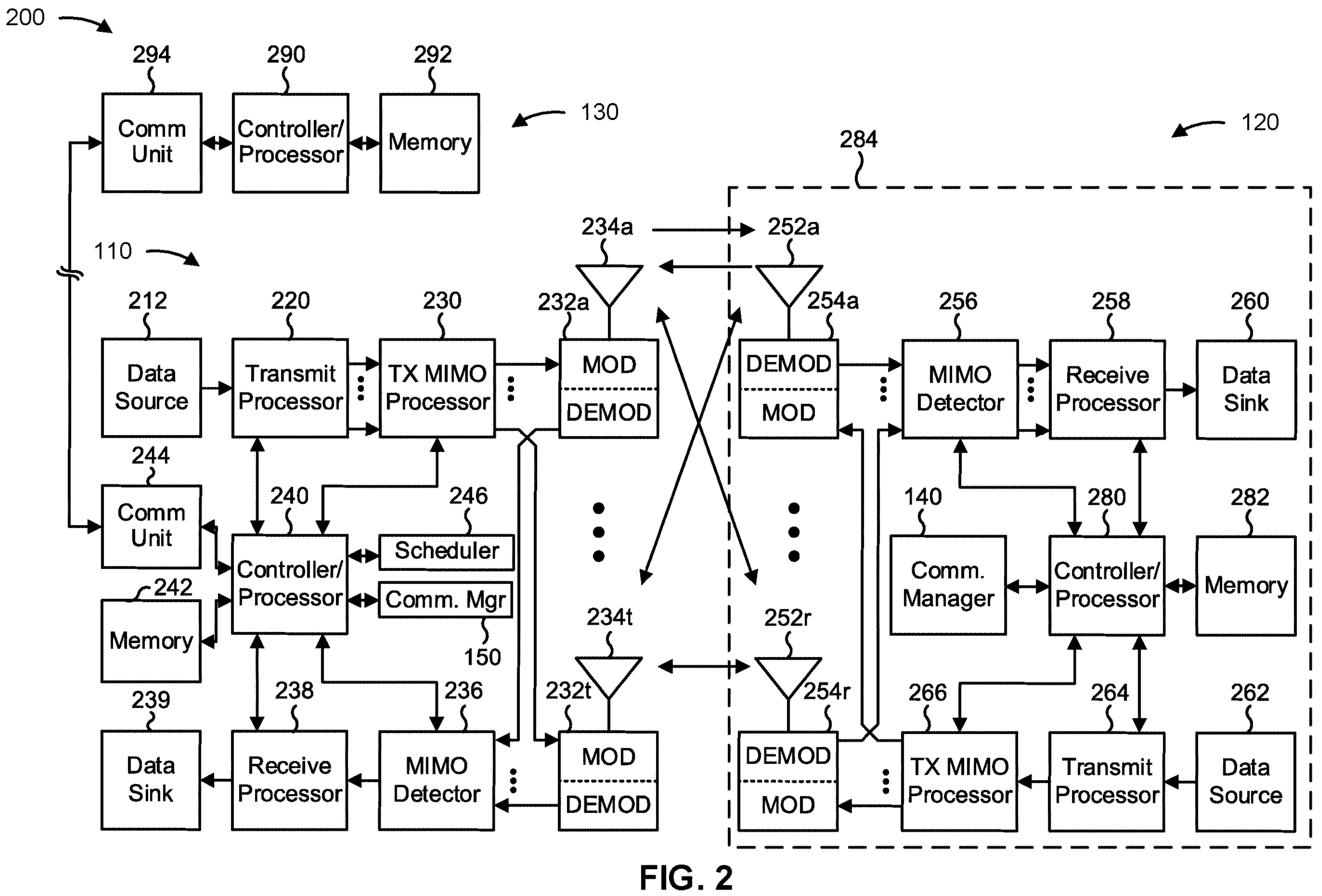
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., 7 modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-12).

The controller/processor 240 of the base station 110, the controller/processor 280 of the UE 120, and/or any other component(s) of FIG. 2 may perform one or more techniques associated with beam identification and simultaneous synchronization signal block transmissions for a network device with multiple beams, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for receiving an SS/PBCH block; and/or means for determining an SS/PBCH block index, associated with the SS/PBCH block, based at least in part on at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE, or an interleaving associated with the PBCH, the interleaving being from a set of possible interleavings for the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for generating an SS/PBCH block, wherein an SS/PBCH block index associated with the SS/PBCH block is indicated via at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE, or an interleaving associated with the PBCH, the interleaving being from a set of possible interleavings for the UE; and/or means for transmitting the SS/PBCH block. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving a first SS/PBCH block; means for receiving a second SS/PBCH block; means for determining, based at least in part on a time gap between the first SS/PBCH block and the second SS/PBCH block, that the first SS/PBCH block and the second SS/PBCH block are included in an SS/PBCH block group; and/or means for determining an SS/PBCH block group index, associated with the SS/PBCH block group, based at least in part on a first SS/PBCH block index associated with the first SS/PBCH block and a second SS/PBCH block index associated with the second SS/PBCH block. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a first SS/PBCH block of an SS/PBCH block group, the first SS/PBCH block indicating a first SS/PBCH block index: and/or means for transmitting a second SS/PBCH block of the SS/PBCH block group, the second SS/PBCH block indicating a second SS/PBCH block index, wherein a time gap between the first SS/PBCH block and the second SS/PBCH block indicates that the first SS/PBCH block and the second SS/PBCH block are included in the SS/PBCH block group, and wherein an SS/PBCH block group index associated with the SS/PBCH block group is indicated via the first SS/PBCH block index and the second SS/PBCH block index. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station includes means for transmitting a first SS/PBCH block; and/or means for transmitting a second SS/PBCH block, the second SS/PBCH block being transmitted simultaneously with the first SS/PBCH block, wherein the second SS/PBCH block is spatially separated from the first SS/PBCH block. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In a wireless communication system, synchronization signal/physical broadcast channel (SS/PBCH) blocks are used during a cell search procedure. In other words, UEs search for synchronization signals caried in SS/PBCH blocks when scanning for a call to camp on. For a given SS/PBCH block received by the UE, the UE decodes the PBCH before proceeding to decode other system information (e.g., transmitted on a physical downlink shared channel (PDSCH)). In some scenarios, SS/PBCH blocks can also be used for one or more other purposes, such as a reference signal received power (RSRP) measurement, a reference signal received quality (RSRQ) measurement, or a signal to interference plus noise ratio (SINR) measurement, among other examples.

In general, an SS/PBCH block is a downlink transmission occupying 20 resource blocks in the frequency domain and four symbols in the time domain. The SS/PBCH block includes a primary synchronization signal (PSS) (e.g., occupying 127 subcarriers in a first symbol), a secondary synchronization signal (SSS) (e.g., occupying 127 subcarriers in a third symbol), and the PBCH (e.g., occupying 20 resource blocks within a second symbol and a fourth symbol, and eight resource blocks in the third symbol). The resource blocks allocated to the PBCH accommodate a payload of the PBCH (referred to as a PBCH payload) and a demodulation reference signal (DMRS) (referred to as a PBCH DMRS). Generally, the PBCH DMRS occupies 25% of the resource elements allocated to the PBCH.

A base station transmits SS/PBCH blocks in SS/PBCH bursts. An SS/PBCH burst includes one or more SS/PBCH blocks within a 5 millisecond (ms) time window (i.e., half of a radio frame), SS/PBCH bursts can be used to address the requirements of beamforming and beam sweeping. For example, each SS/PBCH block included in an SS/PBCH burst may be allocated to a different beam. In the case of digital beamforming, all beams are simultaneously active but each beam is allocated a separate SS/PBCH block within the SS/PBCH burst, so that each beam transmits its SS/PBCH block with different timing. This allows a UE to separate the transmission from each beam and beam indices can be identified based on the timing of the SS/PBCH block. In the case of analog beamforming, beams are not all simultaneously active and beam sweeping is used. Similar to the digital beamforming case, each beam is allocated a separate SS/PBCH block within the SS/PBCH burst so that each beam transmits its SS/PBCH block with different timing (i.e., when the beam becomes active). Beam sweeping is applied throughout the duration of each SS/PBCH burst but the base station (e.g., a packet scheduler) can select the active beam(s) during the time between SS/PBCH bursts.

When a UE first acquires an SS/PBCH block, the UE 120 does not have knowledge of which SS/PBCH block within the SS/PBCH burst has been received. For example, if the base station is transmitting L SS/PBCH blocks within each burst, then the UE does not immediately have knowledge of which of the L SS/PBCH blocks has been received by the UE. An SS/PBCH block can be identified using a combination of a system frame number (SFN), a half radio frame flag, and an SS/PBCH block index. The combination of these items of information uniquely identifies the SS/PBCH block within a 10.24 second time window.

The most significant bits (MSB) of the SFN can be extracted from a master information block (MIB). The least significant bits (LSB) of the SFN can be extracted from the physical layer payload of the PBCH. That is, the LSB of the SFN are transmitted in combination with the MIB on the PBCH.

The half radio frame flag can be extracted from the physical layer payload of the PBCH. Further, in the case of operating bands below 3 gigahertz (GHz), the half radio frame flag can be deduced from the PBCH DMRS scrambling sequence.

Conventionally, in the case of operating bands below 3 GHZ, the two LSB of the SS/PBCH block index are determined based on a scrambling sequence of the PBCH DMRS. Similarly, in the case of operating bands between 3 GHZ and 6 GHz, the three LSB of the SS/PBCH block index are determined based on a scrambling sequence of the PBCH DMRS. In the case of operating bands above 6 GHZ, the three LSB of the SS/PBCH block index are determined based on the scrambling sequence of the PBCH DMRS, and the three MSB of the SS/PBCH block index are determined from the physical layer payload of the PBCH.

In some wireless communication systems, a base station may be capable of using a high number of beams in association with supporting wireless communication. For example, a non-terrestrial base station 110 (e.g., a satellite included in an NTN) may be capable of using a hundred or more beams in association with supporting wireless communication with UEs on the surface. However, a range of supported SS/PBCH block index values may be insufficient to effectively support the use of a high number of beams. For example, the range of the SS/PBCH block index values contains four values for operating bands at or below 3 GHZ (e.g., since the SS/PBCH block index is indicated by two bits). Similarly, the range of the SS/PBCH block index values contains eight values for operating bands 3 GHz and 6 GHz (e.g., since the SS/PBCH block index is indicated by three bits). Further, the range of the SS/PBCH block index values contains 64 values for operating bands above 6 GHz (e.g., since the SS/PBCH block index is indicated by six bits). In a scenario in which the base station needs to transmit SS/PBCH blocks for a high number (e.g., hundreds) of beams, the limited SS/PBCH index value ranges, combined with the SS/PBCH burst structure, can result in a significant amount of delay for a UE to gain access to the network.

Some techniques and apparatuses described herein enable beam identification and simultaneous synchronization signal block transmissions for a network device with multiple beams. In some aspects, the range of SS/PBCH block index values may be increased to support transmission of SS/PBCH blocks for a high number of beams. In some aspects, a beam may be associated with multiple SS/PBCH blocks (e.g., rather than a beam being associated with a single SS/PBCH block) to support transmission of SS/PBCH blocks for a high number of beams. In some aspects, spatially separated SS/PBCH blocks may be simultaneously transmitted in order to support transmission of SS/PBCH blocks for a high number of beams. Additional details are provided below.

Figure 3:
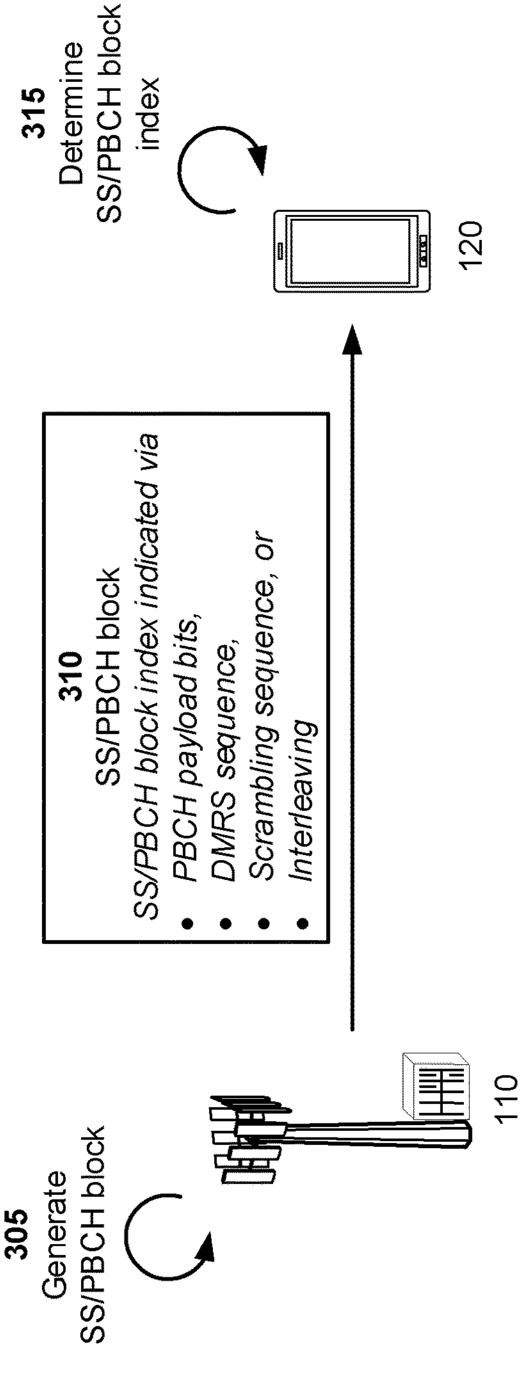
FIGS. 3-5 are diagrams illustrating examples associated with beam identification and simultaneous synchronization signal block transmissions for a network device with multiple beams, in accordance with the present disclosure.

FIG. 3 is a diagram illustrating an example 300 associated with increasing a range of SS/PBCH block index values to support transmission of SS/PBCH block blocks for a higher number of beams. As shown in FIG. 3, a base station 110 (e.g., a satellite) and a UE 120 may communicate with one another. In example 300, the base station 110 may be capable of using a high number (e.g., hundreds) of beams in association with supporting wireless communications with the UE 120.

As shown by reference number 305, the base station 110 may generate an SS/PBCH block. In some aspects, information included in or based on which the SS/PBCH block is generated may be used to indicate an SS/PBCH block index associated with the SS/PBCH block (e.g., such that the UE 120 can identify the SS/PBCH block and, therefore, identify a beam associated with the SS/PBCH block).

In some aspects, the SS/PBCH block index associated with the SS/PBCH block is indicated using (1) a set of bits included in a payload of a PBCH of the SS/PBCH block, (2) a DMRS sequence included in the PBCH, (3) a scrambling sequence associated with the PBCH, and/or (4) an interleaving associated with the PBCH. In some aspects, as described below, indication of the SS/PBCH block index using any one or more of (1) through (4) provides an increased range of SS/PBCH block index values (e.g., as compared to the typical ranges of SS/PBCH block indices described above).

In some aspects, the set of bits includes at least a first number of bits, such as one bit, when a frequency of operation (e.g., an operating band) satisfies a first frequency threshold. For example, the first number of bits may be one bit and the first frequency threshold may be 6 GHz. Thus, in some aspects, the set of bits may include at least one bit when the frequency of operation is at or below 6 GHz. In some aspects, the set of bits includes at least a second number of bits when the frequency of operation does not satisfy the first frequency threshold. For example, the second number of bits may be four bits and the first frequency threshold may be 6 GHz. Thus, in some aspects, the set of bits may include at least four bits when the frequency of operation is above 6 GHz. Put another way, the range of SS/PBCH block indices is increased by increasing the x bits of the PBCH payload that are used to indicate a portion of the SS/PBCH block index to at least x+1 bits, where x=0 for an operating band that satisfies the first frequency threshold (e.g., is below 6 GHZ), and x=3 for an operating band that does not satisfy the first frequency threshold (e.g., is above 6 GHz).

In some aspects, the DMRS sequence is one of a set of possible DMRS sequences. In some aspects, the set of possible DMRS sequences includes at least a first number of DMRS sequences when the frequency of operation satisfies a second frequency threshold. For example, the first number of DMRS sequences may be three DMRS sequences and the second frequency threshold may be 3 GHZ. Thus, in some aspects, the set of DMRS sequences may include at least three DMRS sequences when the frequency of operation is at or below 3 GHz. In some aspects, the set of possible DMRS sequences includes at least a second number of DMRS sequences when the frequency of operation does not satisfy the second frequency threshold. For example, the second number of DMRS sequences may be four DMRS sequences and the second frequency threshold may be 3 GHZ. Thus, in some aspects, the set of DMRS sequences may include at least four DMRS sequences when the frequency of operation is above 3 GHz. Put another way, the range of SS/PBCH block indices is increased by increasing the z possible DMRS sequences conventionally used to indicate a portion of the SS/PBCH block index to at least z+1 possible DMRS sequences, where z=2 for an operating band that satisfies the second frequency threshold (e.g., is below 3 GHZ), and z=3 for an operating band that does not satisfy the second frequency threshold (e.g., is above 3 GHZ).

In some aspects, the scrambling sequence is one of a set of possible scrambling sequences for the UE 120 (e.g., a possible or allowable scrambling sequences from which the scrambling sequence can be selected). Thus, in some aspects, the range of SS/PBCH block indices is increased by using the selection of PBCH scrambling sequences to indicate at least a portion of the SS/PBCH block index.

In some aspects, the interleaving is one of a set of possible interleavings for the UE 120 (e.g., a possible or allowable interleavings from which the interleaving can be selected). Thus, in some aspects, the range of SS/PBCH block indices is increased by using the selection of PBCH interleavings to indicate at least a portion of the SS/PBCH block index.

As shown by reference 310, the base station 110 may transmit, and the UE 120 may receive, the SS/PBCH block including the indication of the SS/PBCH block index. As noted in FIG. 3, the SS/PBCH block index is indicated via at least one of the set of bits of the PBCH payload, the DMRS sequence associated with the PBCH, the scrambling sequence associated with the PBCH, or the interleaving associated with the PBCH.

As shown by reference 315, the UE 120 may determine the SS/PBCH block index associated with the SS/PBCH block. In some aspects, the UE 120 may determine the SS/PBCH block index based at least in part on the set of bits included in the payload of the PBCH of the SS/PBCH block (e.g., at least one bit when the frequency of operation satisfies the first frequency threshold, at least four bits when the frequency of operation does not satisfy the first frequency threshold), the DMRS sequence included in the PBCH (e.g., the DMRS sequence being from a set of possible DMRS sequences including at least a first number of DMRS sequences when the frequency of operation satisfies the second frequency threshold or at least a second number of DMRS sequences when the frequency of operation does not satisfy the second frequency threshold), the scrambling sequence associated with the PBCH, or the interleaving associated with the PBCH. That is, the UE 120 may derive the SS/PBCH block index by combining one or more of the above described items of information—the set of bits in the PBCH payload, the DMRS sequence, the scrambling sequence, and/or the interleaving.

In this way, the range of possible SS/PBCH block indices can be increased, meaning that the base station 110 can uniquely identify a higher number of beams in a given time period, thereby reducing delay for the UE 120 to gain access to the network.

As indicated above, FIG. 3 is provided as an example. Other examples may differ from what is described with respect to FIG. 3.

Figure 4:
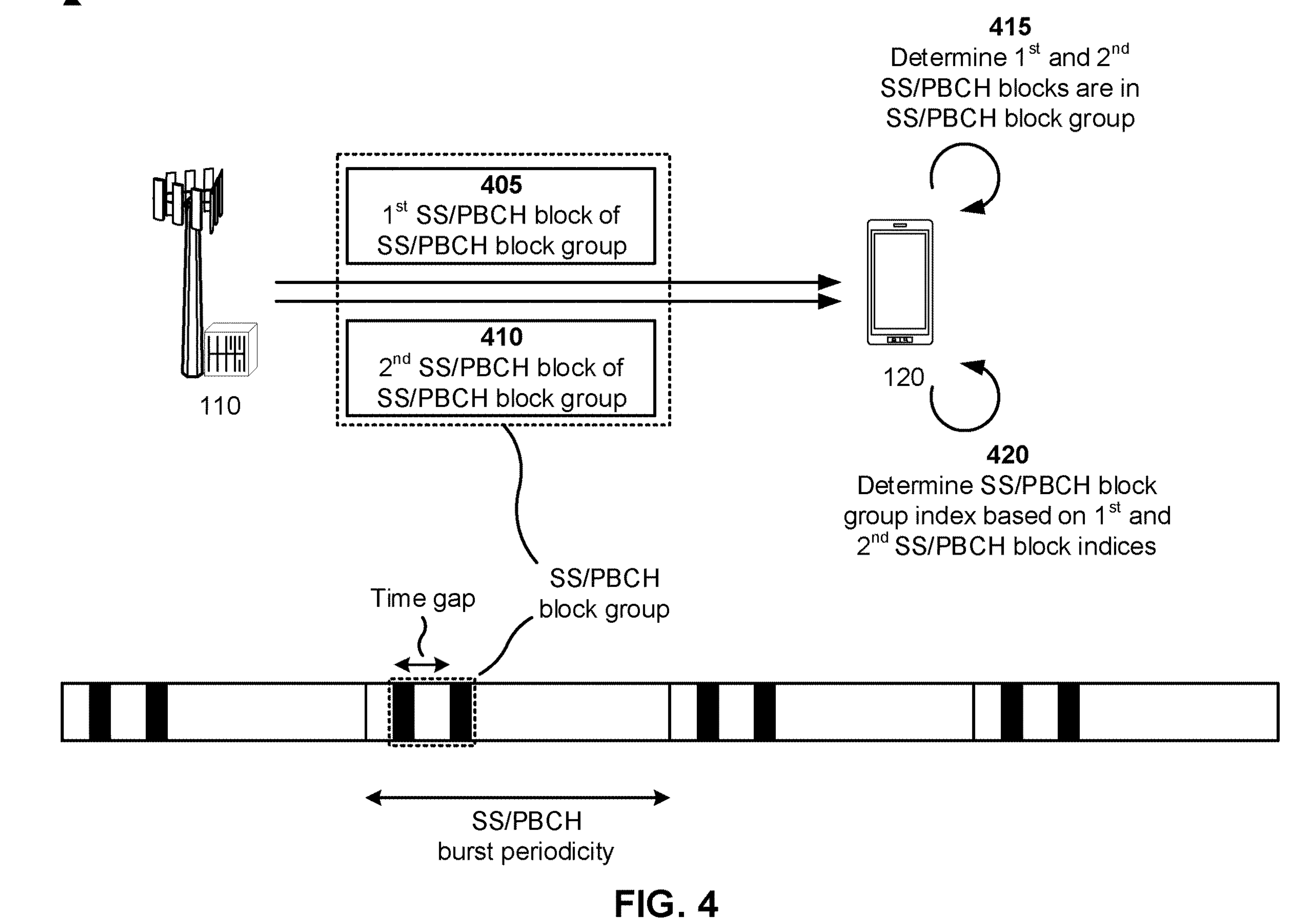

FIG. 4 is a diagram illustrating an example 400 of a beam being associated with multiple SS/PBCH blocks to support transmission of SS/PBCH blocks for a high number of beams. As shown in FIG. 4, a base station 110 (e.g., a satellite) and a UE 120 may communicate with one another. In example 400, the base station 110 may be capable of using a high number (e.g., hundreds) of beams in association with supporting wireless communications with the UE 120.

As shown by reference number 405, the base station 110 may transmit, and the UE 120 may receive, a first SS/PBCH block of an SS/PBCH block group. In some aspects, an SS/PBCH block group includes at least two SS/PBCH blocks, each of which is associated with a single beam. That is, the SS/PBCH block group includes at least two SS/PBCH block blocks associated with the same beam (e.g., rather than a single beam being associated with a single SS/PBCH block). In some aspects, the first SS/PBCH block includes a first SS/PBCH block index (e.g., indicated by one or more bits of the PBCH payload, a DMRS sequence, a scrambling sequence, an interleaving, or the like).

As shown by reference number 410, the base station 110 may transmit, and the UE 120 may receive, a second SS/PBCH block of the SS/PBCH block group. In some aspects, the second SS/PBCH block includes a second SS/PBCH block index (e.g., indicated by one or more bits of the PBCH payload, a DMRS sequence, a scrambling sequence, an interleaving, or the like).

In some aspects, the first SS/PBCH block index and the second SS/PBCH block index are used by the base station 110 to indicate an SS/PBCH block group index associated with the SS/PBCH block group. Thus, in some aspects, the base station 110 may generate the first SS/PBCH block and the second SS/PBCH block so that the first SS/PBCH block index and the second index, when processed by the UE 120 in the manner described below, allow the UE 120 to determine an SS/PBCH block group index that indicates the beam with which the first SS/PBCH block and the second SS/PBCH block are associated, as described below.

In some aspects, the base station 110 may transmit the first SS/PBCH block and the second SS/PBCH block such that a time gap between the first SS/PBCH block and the second SS/PBCH block (e.g., an amount of time between a first symbol of the first SS/PBCH block and a first symbol of the second SS/PBCH block) indicates that the first SS/PBCH block and the second SS/PBCH block are included in the SS/PBCH block group, as described below.

As shown by reference 415, the UE 120 may determine, based at least in part on the time gap between the first SS/PBCH block and the second SS/PBCH block, that the first SS/PBCH block and the second SS/PBCH block are included in the SS/PBCH block group. For example, the UE 120 may be configured with a time gap, and may determine whether the time gap between a given pair of SS/PBCH blocks matches the time gap configured on the UE 120. In example 400, the UE 120 determines that the time gap between the first SS/PBCH block and the second SS/PBCH block matches the time gap configured on the UE 120, and therefore the UE 120 determines that the first SS/PBCH block and the second SS/PBCH block are included in an SS/PBCH block group.

In some aspects, as indicated in the lower portion of FIG. 4, the time gap may be less than half of an SS/PBCH burst periodicity associated with the first and second SS/PBCH blocks. In some aspects, the time gap is configured on the UE 120 according to a wireless communication standard (e.g., the time gap may be configured on the UE 120 according to an applicable standard). In some aspects, the base station 110 may transmit, and the UE 120 may receive, an indication of the time gap in, for example, a system information block (SIB).

As shown by reference 420, the UE 120 may determine the SS/PBCH block group index, associated with the SS/PBCH block group, based at least in part on the first SS/PBCH block index and the second SS/PBCH block index. For example, in some aspects, the UE 120 may determine the SS/PBCH block group index by concatenating a set of bits corresponding to the first SS/PBCH block index and a set of bits corresponding to the second SS/PBCH block index. As a particular example, the base station 110 may transmit the first SS/PBCH block including a first SS/PBCH block index of 34 (e.g., in a series of six bits), and may transmit the second SS/PBCH block including a second SS/PBCH block index of 28 (e.g., in a series of six bits). Here, the UE 120 may determine the SS/PBCH block group index by concatenating the bits of the first SS/PBCH block index and the bits of the second SS/PBCH block index to determine an SS/PBCH block group index of 2204 (e.g., 34×64+28=2204).

In this way, by using multiple SS/PBCH blocks for the same beam, the range of SS/PBCH block index values can be increased, meaning that the base station 110 can uniquely identify a higher number of beams in a given time period, thereby reducing delay for the UE 120 to gain access to the network. Notably, using multiple SS/PBCH blocks in this manner does not require a change to the conventional SS/PBCH block message format described above.

As indicated above, FIG. 4 is provided as an example. Other examples may differ from what is described with respect to FIG. 4.

As described above, different SS/PBCH blocks are typically transmitted at different times (i.e., SS/PBCH blocks do not overlap in the time domain). In general, temporal separation of the SS/PBCH blocks is used to prevent SS/PBCH blocks from interfering with one another at the UE 120 (e.g., due to multipath propagation). However, in some wireless communication systems, such as a wireless communication system including a non-terrestrial base station 110, communication between the base station 110 and UEs 120 is primarily line-of-sight, and multipath propagation is not a significant concern. In such a scenario, temporal separation of the SS/PBCH blocks may not be necessary. Therefore, in some aspects, the base station 110 may simultaneously transmit multiple SS/PBCH blocks (e.g., such that the multiple SS/PBCH blocks at least partially overlap in the time domain) in order to support transmission of SS/PBCH blocks for a high number of beams.

Figure 5:
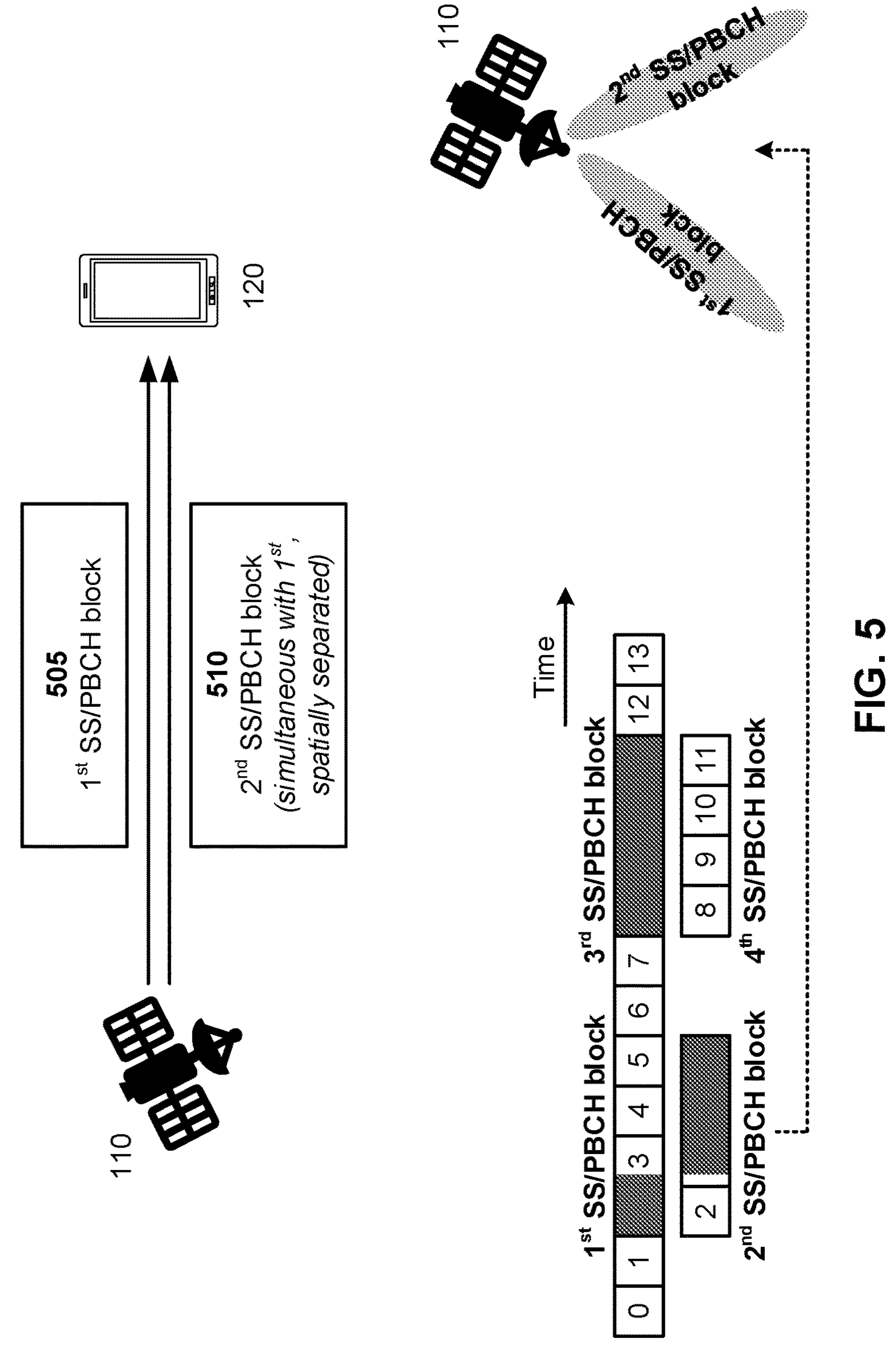

FIG. 5 is a diagram illustrating an example 500 of spatially separated SS/PBCH blocks being simultaneously transmitted in order to support transmission of SS/PBCH blocks for a high number of beams. As shown in FIG. 5, a base station 110 (e.g., a satellite) and a UE 120 may communicate with one another. In example 500, the base station 110 may be capable of using a high number (e.g., hundreds) of beams in association with supporting wireless communications with the UE 120.

As shown by reference number 505, the base station 110 may transmit a first SS/PBCH block. Further, as shown by reference 510, the base station 110 may transmit a second SS/PBCH block (e.g., at the same frequency as the first SS/PBCH block). In some aspects, the second SS/PBCH block is transmitted simultaneously with the first SS/PBCH block. That is, in some aspects, the first SS/PBCH block and the second SS/PBCH block may at least partially overlap in the time domain.

In some aspects, the second SS/PBCH block is spatially separated from the first SS/PBCH block. In some aspects, spatial separation of the first SS/PBCH block and the second SS/PBCH block is needed in order to prevent interference at the UE 120 among the first and second SS/PBCH blocks. An illustrative example of the base station 110 transmitting the first SS/PBCH block and the second multiple SS/PBCH block simultaneously, with spatial separation, is provided in the lower portion of FIG. 5.

Notably, in example 500, a UE 120 cell search performed during the time at which the first SS/PBCH block and the second SS/PBCH block are transmitted in effect enables the UE 120 to search for two SS/PBCH blocks at the same time. As a result, the base station 110 may transmit SS/PBCH blocks, and the UE 120 may complete a cell search, with a reduced delay (e.g., as compared to each SS/PBCH block being transmitted in a non-simultaneous manner). In this way, the transmission of multiple SS/PBCH blocks simultaneously, with spatial separation, reduces delay for the UE 120 to gain access to the network.

As indicated above, FIG. 5 is provided as an example. Other examples may differ from what is described with respect to FIG. 5.

Figure 6:
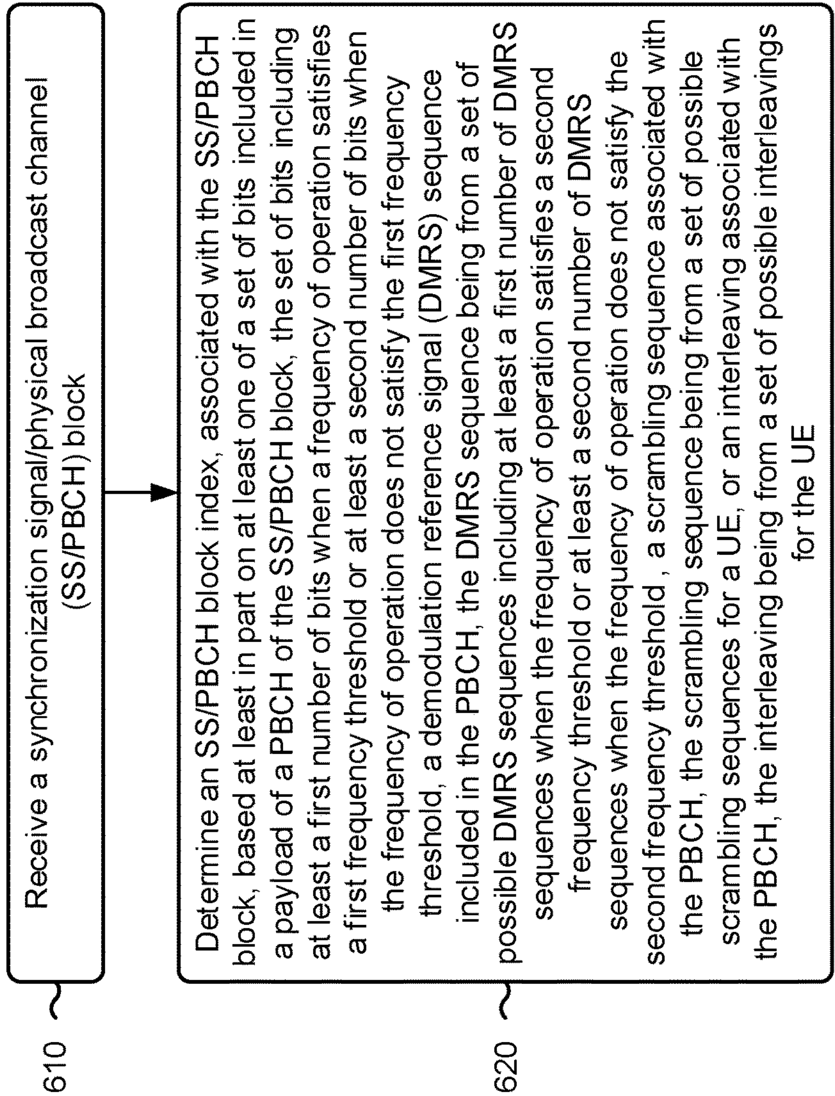
FIGS. 6-10 are diagrams illustrating example processes associated with beam identification and simultaneous synchronization signal block transmissions for a network device with multiple beams, in accordance with the present disclosure.

FIG. 6 is a diagram illustrating an example process 600 performed, for example, by a UE, in accordance with the present disclosure. Example process 600 is an example where the UE (e.g., UE 120) performs operations associated with beam identification and simultaneous synchronization signal block transmissions for a network device with multiple beams.

As shown in FIG. 6, in some aspects, process 600 may include receiving an SS/PBCH block (block 610). For example, the UE (e.g., using communication manager 140 and/or reception component 1102, depicted in FIG. 11) may receive an SS/PBCH block, as described above.

As further shown in FIG. 6, in some aspects, process 600 may include determining an SS/PBCH block index, associated with the SS/PBCH block, based at least in part on at least one of: a set of bits included in a payload of a PBCH of the SS/PBCH block, the set of bits including at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE, or an interleaving associated with the PBCH, the interleaving being from a set of possible interleavings for the UE (block 620). For example, the UE (e.g., using communication manager 140 and/or determination component 1108, depicted in FIG. 11) may determine an SS/PBCH block index, associated with the SS/PBCH block, based at least in part on at least one of: a set of bits included in a payload of a PBCH of the SS/PBCH block, the set of bits including at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE, or an interleaving associated with the PBCH, the interleaving being from a set of possible interleavings for the UE, as described above.

Process 600 may include additional aspects, such as any single aspect or any combination of aspects described below and/or in connection with one or more other processes described elsewhere herein.

In a first aspect, satisfying the first frequency threshold comprises being at or below 6 gigahertz, and not satisfying the first frequency threshold comprises being above 6 gigahertz.

In a second aspect, alone or in combination with the first aspect, satisfying the second frequency threshold comprises being at or below 3 gigahertz, and not satisfying the second frequency threshold comprises being above 3 gigahertz.

In a third aspect, alone or in combination with one or more of the first and second aspects, the first number of bits is one bit.

In a fourth aspect, alone or in combination with one or more of the first through third aspects, the second number of bits is four bits.

In a fifth aspect, alone or in combination with one or more of the first through fourth aspects, the first number of DMRS sequences is three DMRS sequences.

In a sixth aspect, alone or in combination with one or more of the first through fifth aspects, the second number of DMRS sequences is four DMRS sequences.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
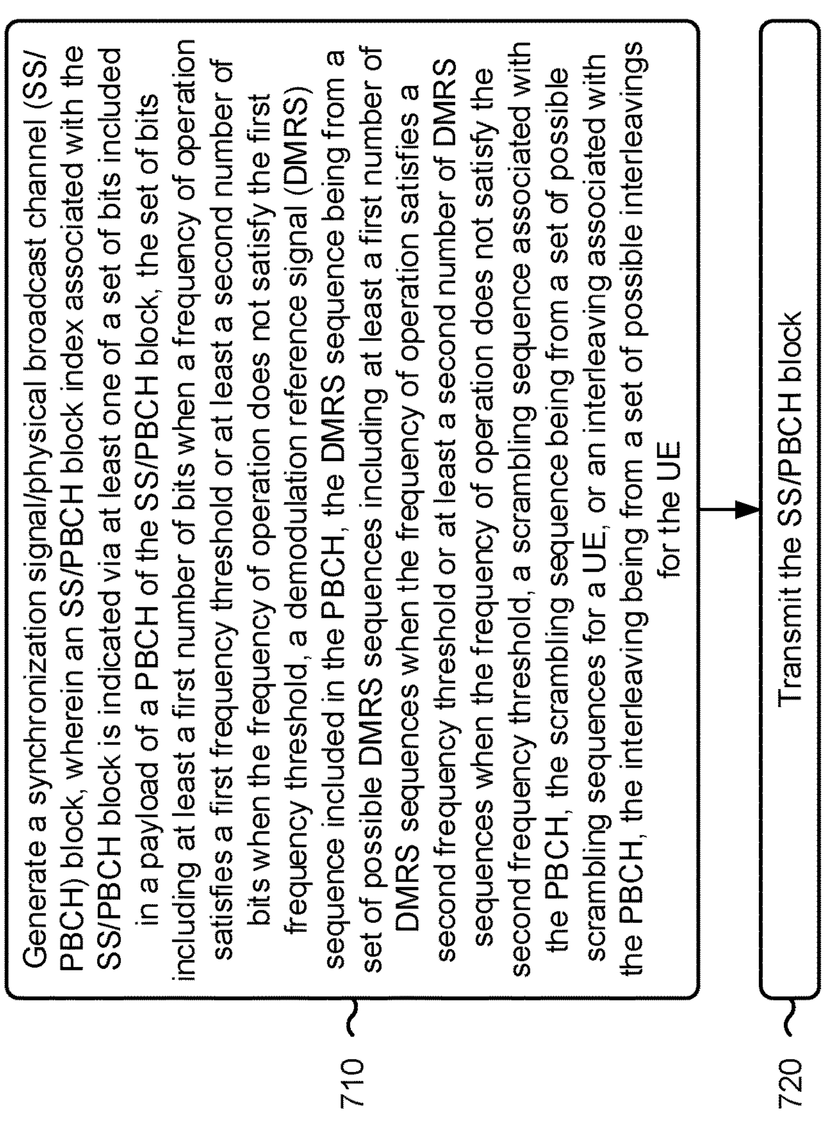

FIG. 7 is a diagram illustrating an example process 700 performed, for example, by a base station, in accordance with the present disclosure. Example process 700 is an example where the base station (e.g., base station 110) performs operations associated with beam identification and simultaneous synchronization signal block transmissions for a network device with multiple beams.

As shown in FIG. 7, in some aspects, process 700 may include generating an SS/PBCH block, wherein an SS/PBCH block index associated with the SS/PBCH block is indicated via at least one of: a set of bits included in a payload of a PBCH of the SS/PBCH block, the set of bits including at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE, or an interleaving associated with the PBCH, the interleaving being from a set of possible interleavings for the UE (block 710). For example, the base station (e.g., using communication manager 150 and/or generation component 1208, depicted in FIG. 12) may generate an SS/PBCH block, wherein an SS/PBCH block index associated with the SS/PBCH block is indicated via at least one of: a set of bits included in a payload of a PBCH of the SS/PBCH block, the set of bits including at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE (e.g., a UE 120), or an interleaving associated with the PBCH, the interleaving being from a set of possible interleavings for the UE, as described above.

As further shown in FIG. 7, in some aspects, process 700 may include transmitting the SS/PBCH block (block 720). For example, the base station (e.g., using communication manager 150 and/or transmission component 1204, depicted in FIG. 12) may transmit the SS/PBCH block, as described above.

Process 700 may include additional aspects, such as any single aspect or any combination of aspects described below and/or in connection with one or more other processes described elsewhere herein.

In a first aspect, satisfying the first frequency threshold comprises being at or below 6 gigahertz, and not satisfying the first frequency threshold comprises being above 6 gigahertz.

In a second aspect, alone or in combination with the first aspect, satisfying the second frequency threshold comprises being at or below 3 gigahertz, and not satisfying the second frequency threshold comprises being above 3 gigahertz.

In a third aspect, alone or in combination with one or more of the first and second aspects, the first number of bits is one bit.

In a fourth aspect, alone or in combination with one or more of the first through third aspects, the second number of bits is four bits.

In a fifth aspect, alone or in combination with one or more of the first through fourth aspects, the first number of DMRS sequences is three DMRS sequences.

In a sixth aspect, alone or in combination with one or more of the first through fifth aspects, the second number of DMRS sequences is four DMRS sequences.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
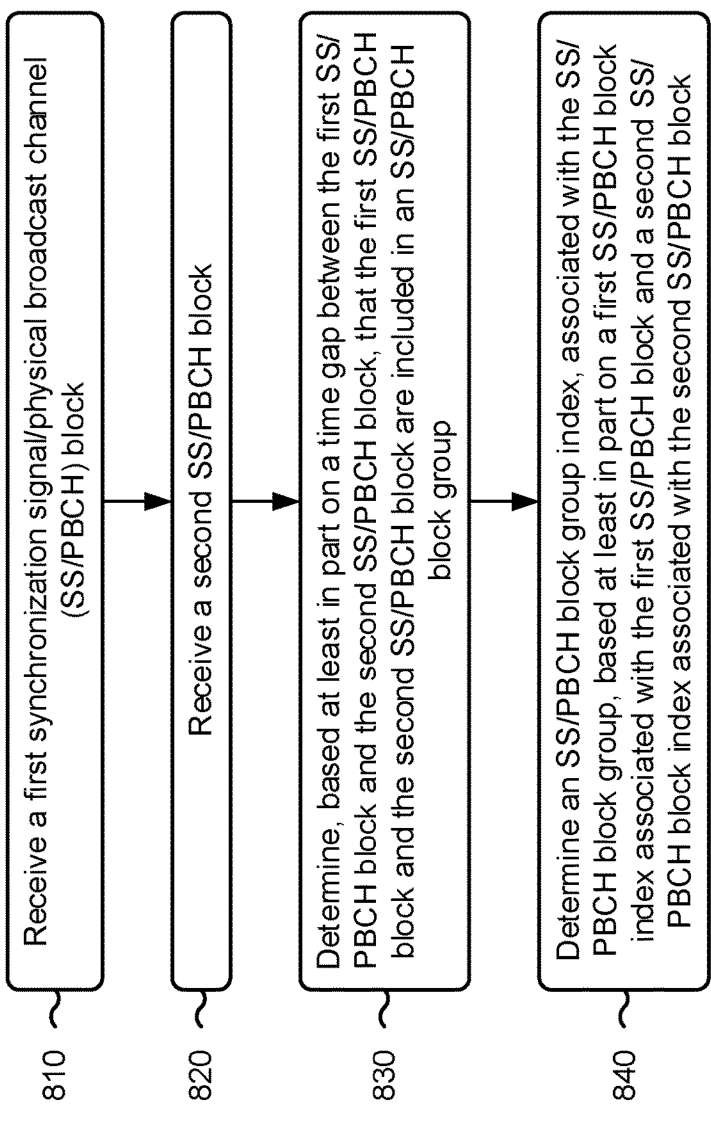

FIG. 8 is a diagram illustrating an example process 800 performed, for example, by a UE, in accordance with the present disclosure. Example process 800 is an example where the UE (e.g., UE 120) performs operations associated with beam identification and simultaneous synchronization signal block transmissions for a network device with multiple beams.

As shown in FIG. 8, in some aspects, process 800 may include receiving a first SS/PBCH block (block 810). For example, the UE (e.g., using communication manager 140 and/or reception component 1102, depicted in FIG. 11) may receive a first SS/PBCH block, as described above.

As further shown in FIG. 8, in some aspects, process 800 may include receiving a second SS/PBCH block (block 820). For example, the UE (e.g., using communication manager 140 and/or reception component 1102, depicted in FIG. 11) may receive a second SS/PBCH block, as described above.

As further shown in FIG. 8, in some aspects, process 800 may include determining, based at least in part on a time gap between the first SS/PBCH block and the second SS/PBCH block, that the first SS/PBCH block and the second SS/PBCH block are included in an SS/PBCH block group (block 830). For example, the UE (e.g., using communication manager 140 and/or determination component 1108, depicted in FIG. 11) may determine, based at least in part on a time gap between the first SS/PBCH block and the second SS/PBCH block, that the first SS/PBCH block and the second SS/PBCH block are included in an SS/PBCH block group, as described above.

As further shown in FIG. 8, in some aspects, process 800 may include determining an SS/PBCH block group index, associated with the SS/PBCH block group, based at least in part on a first SS/PBCH block index associated with the first SS/PBCH block and a second SS/PBCH block index associated with the second SS/PBCH block (block 840). For example, the UE (e.g., using communication manager 140 and/or determination component 1108, depicted in FIG. 11) may determine an SS/PBCH block group index, associated with the SS/PBCH block group, based at least in part on a first SS/PBCH block index associated with the first SS/PBCH block and a second SS/PBCH block index associated with the second SS/PBCH block, as described above.

Process 800 may include additional aspects, such as any single aspect or any combination of aspects described below and/or in connection with one or more other processes described elsewhere herein.

In a first aspect, the time gap is less than half of an SS/PBCH burst periodicity.

In a second aspect, alone or in combination with the first aspect, the time gap is configured according to a wireless communication standard.

In a third aspect, alone or in combination with any of the first and second aspects, process 800 includes receiving an indication of the time gap in a system information block.

In a fourth aspect, alone or in combination with any of the first through third aspects, determining the SS/PBCH block group index comprises concatenating a set of bits corresponding to the first SS/PBCH block index and a set of bits corresponding to the second SS/PBCH block index.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
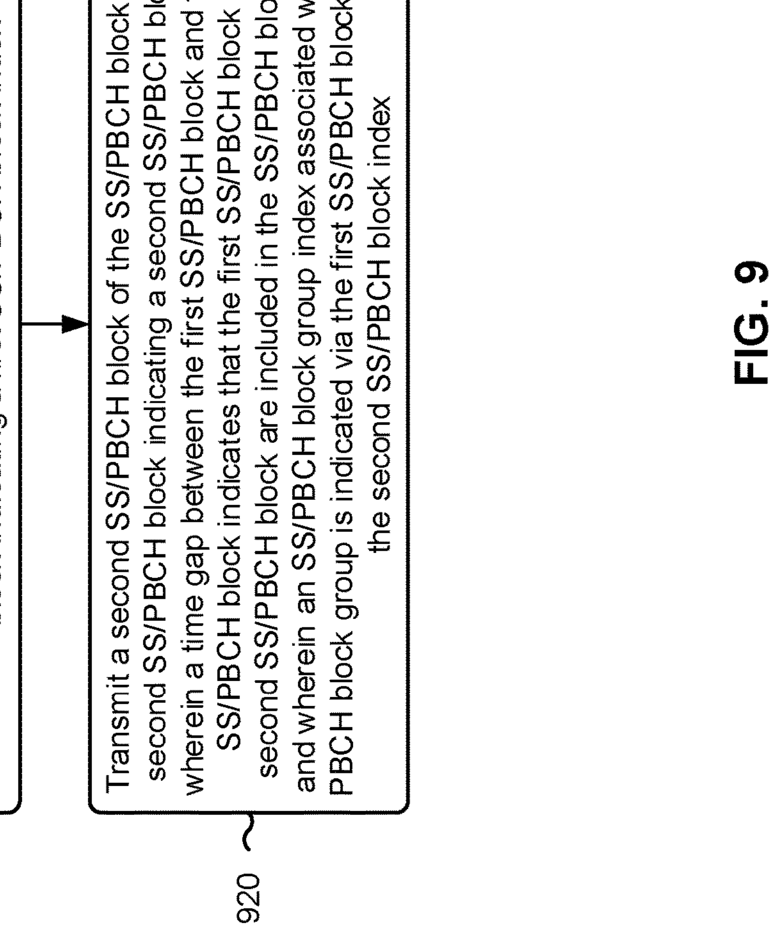

FIG. 9 is a diagram illustrating an example process 900 performed, for example, by a base station, in accordance with the present disclosure. Example process 900 is an example where the base station (e.g., base station 110) performs operations associated with beam identification and simultaneous synchronization signal block transmissions for a network device with multiple beams.

As shown in FIG. 9, in some aspects, process 900 may include transmitting a first SS/PBCH block of an SS/PBCH block group, the first SS/PBCH block indicating a first SS/PBCH block index (block 910). For example, the base station (e.g., using communication manager 150 and/or transmission component 1204, depicted in FIG. 12) may transmit a first SS/PBCH block of an SS/PBCH block group, the first SS/PBCH block indicating a first SS/PBCH block index, as described above.

As further shown in FIG. 9, in some aspects, process 900 may include transmitting a second SS/PBCH block of the SS/PBCH block group, the second SS/PBCH block indicating a second SS/PBCH block index, wherein a time gap between the first SS/PBCH block and the second SS/PBCH block indicates that the first SS/PBCH block and the second SS/PBCH block are included in the SS/PBCH block group, and wherein an SS/PBCH block group index associated with the SS/PBCH block group is indicated via the first SS/PBCH block index and the second SS/PBCH block index (block 920). For example, the base station (e.g., using communication manager 150 and/or transmission component 1204, depicted in FIG. 12) may transmit a second SS/PBCH block of the SS/PBCH block group, the second SS/PBCH block indicating a second SS/PBCH block index, wherein a time gap between the first SS/PBCH block and the second SS/PBCH block indicates that the first SS/PBCH block and the second SS/PBCH block are included in the SS/PBCH block group, and wherein an SS/PBCH block group index associated with the SS/PBCH block group is indicated via the first SS/PBCH block index and the second SS/PBCH block index, as described above.

Process 900 may include additional aspects, such as any single aspect or any combination of aspects described below and/or in connection with one or more other processes described elsewhere herein.

In a first aspect, the time gap is less than half of an SS/PBCH burst periodicity.

In a second aspect, alone or in combination with the first aspect, the time gap is configured according to a wireless communication standard.

In a third aspect, alone or in combination with any of the first and second aspects, process 900 includes transmitting an indication of the time gap in a system information block.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
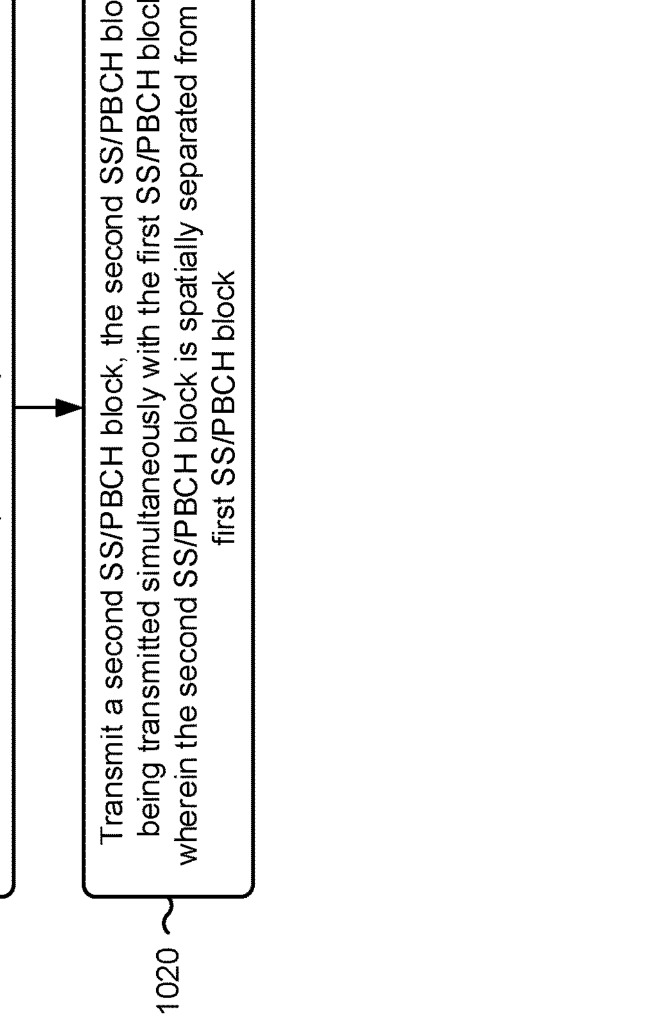

FIG. 10 is a diagram illustrating an example process 1000 performed, for example, by a base station, in accordance with the present disclosure. Example process 1000 is an example where the base station (e.g., base station 110) performs operations associated with beam identification and simultaneous synchronization signal block transmissions for a network device with multiple beams.

As shown in FIG. 10, in some aspects, process 1000 may include transmitting a first SS/PBCH block (block 1010). For example, the base station (e.g., using communication manager 150 and/or transmission component 1204, depicted in FIG. 12) may transmit a first SS/PBCH block, as described above.

As further shown in FIG. 10, in some aspects, process 1000 may include transmitting a second SS/PBCH block, the second SS/PBCH block being transmitted simultaneously with the first SS/PBCH block, wherein the second SS/PBCH block is spatially separated from the first SS/PBCH block (block 1020). For example, the base station (e.g., using communication manager 150 and/or transmission component 1204, depicted in FIG. 12) may transmit a second SS/PBCH block, the second SS/PBCH block being transmitted simultaneously with the first SS/PBCH block, wherein the second SS/PBCH block is spatially separated from the first SS/PBCH block, as described above. In some aspects, the second SS/PBCH block is spatially separated from the first SS/PBCH block.

Process 1000 may include additional aspects, such as any single aspect or any combination of aspects described below and/or in connection with one or more other processes described elsewhere herein.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
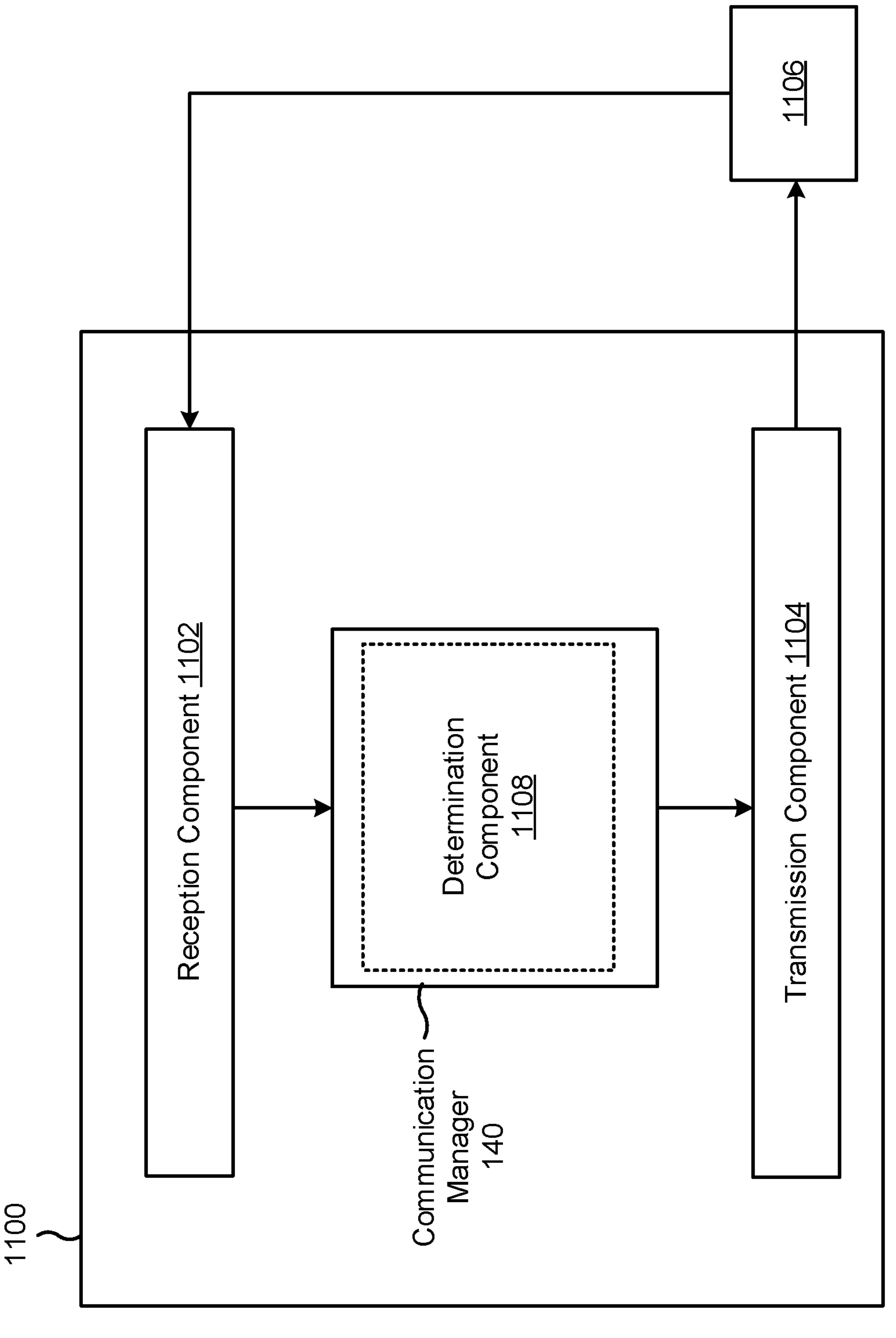
FIGS. 11 and 12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a determination component 1108, among other examples.

In some aspects, the apparatus 1100 may be configured to perform one or more operations described herein in connection with FIGS. 3-5. Additionally, or alternatively, the apparatus 1100 may be configured to perform one or more processes described herein, such as process 600 of FIG. 6, process 800 of FIG. 8, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive an SS/PBCH block. The determination component 1108 may determine an SS/PBCH block index, associated with the SS/PBCH block, based at least in part on at least one of a set of bits included in a payload of a PBCH of the SS/PBCH block, the set of bits including at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE, or an interleaving associated with the PBCH, the interleaving being from a set of possible interleavings for the UE.

The reception component 1102 may receive a first SS/PBCH block. The reception component 1102 may receive a second SS/PBCH block. The determination component 1108 may determine, based at least in part on a time gap between the first SS/PBCH block and the second SS/PBCH block, that the first SS/PBCH block and the second SS/PBCH block are included in an SS/PBCH block group. The determination component 1108 may determine an SS/PBCH block group index, associated with the SS/PBCH block group, based at least in part on a first SS/PBCH block index associated with the first SS/PBCH block and a second SS/PBCH block index associated with the second SS/PBCH block. The reception component 1102 may receive an indication of the time gap in a system information block.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
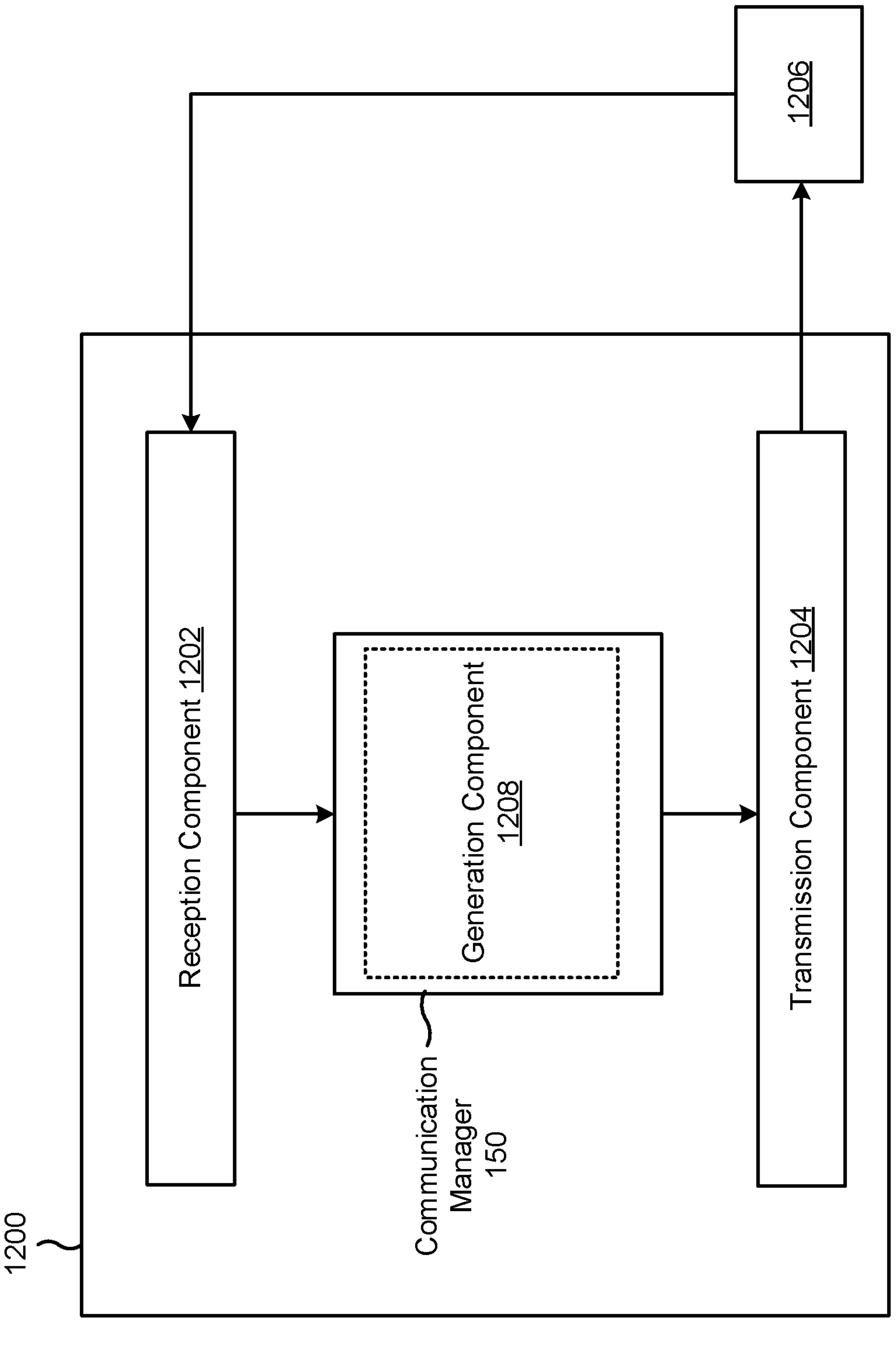

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a generation component 1208, among other examples.

In some aspects, the apparatus 1200 may be configured to perform one or more operations described herein in connection with FIGS. 3-5. Additionally, or alternatively, the apparatus 1200 may be configured to perform one or more processes described herein, such as process 700 of FIG. 7, process 900 of FIG. 9, process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The generation component 1208 may generate an SS/PBCH block, wherein an SS/PBCH block index associated with the SS/PBCH block is indicated via at least one of a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE, or an interleaving associated with the PBCH, the interleaving being from a set of possible interleavings for the UE. The transmission component 1204 may transmit the SS/PBCH block.

The transmission component 1204 may transmit a first SS/PBCH block of an SS/PBCH block group, the first SS/PBCH block indicating a first SS/PBCH block index. The transmission component 1204 may transmit a second SS/PBCH block of the SS/PBCH block group, the second SS/PBCH block indicating a second SS/PBCH block index, wherein a time gap between the first SS/PBCH block and the second SS/PBCH block indicates that the first SS/PBCH block and the second SS/PBCH block are included in the SS/PBCH block group, and wherein an SS/PBCH block group index associated with the SS/PBCH block group is indicated via the first SS/PBCH block index and the second SS/PBCH block index. The transmission component 1204 may transmit an indication of the time gap in a system information block.

The transmission component 1204 may transmit a first SS/PBCH block/PBCH block. The transmission component 1204 may transmit a second SS/PBCH block, the second SS/PBCH block being transmitted simultaneously with the first SS/PBCH block wherein the second SS/PBCH block is spatially separated from the first SS/PBCH block.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving an SS/PBCH block; and determining an SS/PBCH block index, associated with the SS/PBCH block, based at least in part on at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for the UE, or an interleaving associated with the PBCH, the interleaving being from a set of possible interleavings for the UE.

Aspect 2: The method of Aspect 1, wherein satisfying the first frequency threshold comprises being at or below 6 gigahertz, and not satisfying the first frequency threshold comprises being above 6 gigahertz.

Aspect 3: The method of any of Aspects 1-2, wherein satisfying the second frequency threshold comprises being at or below 3 gigahertz, and not satisfying the second frequency threshold comprises being above 3 gigahertz. Aspect 4: The method of any of Aspects 1-3, wherein the first number of bits is one bit.

Aspect 5: The method of any of Aspects 1-4, wherein the second number of bits is four bits.

Aspect 6: The method of any of Aspects 1-5, wherein the first number of DMRS sequences is three DMRS sequences.

Aspect 7: The method of any of Aspects 1-6, wherein the second number of DMRS sequences is four DMRS sequences.

Aspect 8: A method of wireless communication performed by a base station, comprising: generating an SS/PBCH block, wherein an SS/PBCH block index associated with the SS/PBCH block is indicated via at least one of: a set of bits included in a payload of a PBCH of the SS/PBCH block, the set of bits including: at least a first number of bits when a frequency of operation satisfies a first frequency threshold, or at least a second number of bits when the frequency of operation does not satisfy the first frequency threshold, a demodulation reference signal (DMRS) sequence included in the PBCH, the DMRS sequence being from a set of possible DMRS sequences including: at least a first number of DMRS sequences when the frequency of operation satisfies a second frequency threshold, or at least a second number of DMRS sequences when the frequency of operation does not satisfy the second frequency threshold, a scrambling sequence associated with the PBCH, the scrambling sequence being from a set of possible scrambling sequences for a UE, or an interleaving associated with the PBCH, the interleaving being from a set of possible interleavings for the UE; and transmitting the SS/PBCH block.

Aspect 9: The method of Aspect 8, wherein satisfying the first frequency threshold comprises being at or below 6 gigahertz, and not satisfying the first frequency threshold comprises being above 6 gigahertz.

Aspect 10: The method of any of Aspects 8-9, wherein satisfying the second frequency threshold comprises being at or below 3 gigahertz, and not satisfying the second frequency threshold comprises being above 3 gigahertz.

Aspect 11: The method of any of Aspects 8-10, wherein the first number of bits is one bit.

Aspect 12: The method of any of Aspects 8-11, wherein the second number of bits is four bits.

Aspect 13: The method of any of Aspects 8-12, wherein the first number of DMRS sequences is three DMRS sequences.

Aspect 14: The method of any of Aspects 8-13, wherein the second number of DMRS sequences is four DMRS sequences.

Aspect 15: A method of wireless communication performed by a UE, comprising: receiving a first SS/PBCH block; receiving a second SS/PBCH block; determining, based at least in part on a time gap between the first SS/PBCH block and the second SS/PBCH block, that the first SS/PBCH block and the second SS/PBCH block are included in an SS/PBCH block group; and determining an SS/PBCH block group index, associated with the SS/PBCH block group, based at least in part on a first SS/PBCH block index associated with the first SS/PBCH block and a second SS/PBCH block index associated with the second SS/PBCH block.

Aspect 16: The method of Aspect 7, wherein the time gap is less than half of an SS/PBCH burst periodicity.

Aspect 17: The method of any of Aspects 7-8, wherein the time gap is configured according to a wireless communication standard.

Aspect 18: The method of any of Aspects 7-9, further comprising receiving an indication of the time gap in a system information block.

Aspect 19: The method of any of Aspects 7-10, wherein determining the SS/PBCH block group index comprises concatenating a set of bits corresponding to the first SS/PBCH block index and a set of bits corresponding to the second SS/PBCH block index.

Aspect 20: A method of wireless communication performed by a base station, comprising: transmitting a first SS/PBCH block of an SS/PBCH block group, the first SS/PBCH block indicating a first SS/PBCH block index; and transmitting a second SS/PBCH block of the SS/PBCH block group, the second SS/PBCH block indicating a second SS/PBCH block index, wherein a time gap between the first SS/PBCH block and the second SS/PBCH block indicates that the first SS/PBCH block and the second SS/PBCH block are included in the SS/PBCH block group, and wherein an SS/PBCH block group index associated with the SS/PBCH block group is indicated via the first SS/PBCH block index and the second SS/PBCH block index.

Aspect 21: The method of Aspect 12, wherein the time gap is less than half of an SS/PBCH burst periodicity.

Aspect 22: The method of any of Aspects 12-13, wherein the time gap is configured according to a wireless communication standard.

Aspect 23: The method of any of Aspects 12-14, further comprising transmitting an indication of the time gap in a system information block.

Aspect 24: A method of wireless communication performed by a base station, comprising: transmitting a first SS/PBCH block; and transmitting a second SS/PBCH block, the second SS/PBCH block being transmitted simultaneously with the first SS/PBCH block, wherein the second SS/PBCH block is spatially separated from the first SS/PBCH block.

Aspect 25: An apparatus for wireless communication at a device, comprising a processor; memory coupled with the processor; and instructions stored in the memory and executable by the processor to cause the apparatus to perform the method of one or more of Aspects 1-7.

Aspect 268: A device for wireless communication, comprising a memory and one or more processors coupled to the memory, the one or more processors configured to perform the method of one or more of Aspects 1-7.

Aspect 27: An apparatus for wireless communication, comprising at least one means for performing the method of one or more of Aspects 1-7.

Aspect 28: A non-transitory computer-readable medium storing code for wireless communication, the code comprising instructions executable by a processor to perform the method of one or more of Aspects 1-7.

Aspect 29: A non-transitory computer-readable medium storing a set of instructions for wireless communication, the set of instructions comprising one or more instructions that, when executed by one or more processors of a device, cause the device to perform the method of one or more of Aspects 1-7.

Aspect 30: An apparatus for wireless communication at a device, comprising a processor; memory coupled with the processor; and instructions stored in the memory and executable by the processor to cause the apparatus to perform the method of one or more of Aspects 4-6.

Aspect 31: A device for wireless communication, comprising a memory and one or more processors coupled to the memory, the one or more processors configured to perform the method of one or more of Aspects 8-14.

Aspect 32: An apparatus for wireless communication, comprising at least one means for performing the method of one or more of Aspects 8-14.

Aspect 33: A non-transitory computer-readable medium storing code for wireless communication, the code comprising instructions executable by a processor to perform the method of one or more of Aspects 8-14.

Aspect 34: A non-transitory computer-readable medium storing a set of instructions for wireless communication, the set of instructions comprising one or more instructions that, when executed by one or more processors of a device, cause the device to perform the method of one or more of Aspects 8-14.

Aspect 35: An apparatus for wireless communication at a device, comprising a processor; memory coupled with the processor; and instructions stored in the memory and executable by the processor to cause the apparatus to perform the method of one or more of Aspects 15-19.

Aspect 36: A device for wireless communication, comprising a memory and one or more processors coupled to the memory, the one or more processors configured to perform the method of one or more of Aspects 15-19.

Aspect 37: An apparatus for wireless communication, comprising at least one means for performing the method of one or more of Aspects 15-19.

Aspect 38: A non-transitory computer-readable medium storing code for wireless communication, the code comprising instructions executable by a processor to perform the method of one or more of Aspects 15-19.

Aspect 39: A non-transitory computer-readable medium storing a set of instructions for wireless communication, the set of instructions comprising one or more instructions that, when executed by one or more processors of a device, cause the device to perform the method of one or more of Aspects 15-19.

Aspect 40: An apparatus for wireless communication at a device, comprising a processor; memory coupled with the processor; and instructions stored in the memory and executable by the processor to cause the apparatus to perform the method of one or more of Aspects 20-23.

Aspect 41: A device for wireless communication, comprising a memory and one or more processors coupled to the memory, the one or more processors configured to perform the method of one or more of Aspects 20-23.

Aspect 42: An apparatus for wireless communication, comprising at least one means for performing the method of one or more of Aspects 20-23.

Aspect 43: A non-transitory computer-readable medium storing code for wireless communication, the code comprising instructions executable by a processor to perform the method of one or more of Aspects 20-23.

Aspect 44: A non-transitory computer-readable medium storing a set of instructions for wireless communication, the set of instructions comprising one or more instructions that, when executed by one or more processors of a device, cause the device to perform the method of one or more of Aspects 20-23.

Aspect 45: An apparatus for wireless communication at a device, comprising a processor; memory coupled with the processor; and instructions stored in the memory and executable by the processor to cause the apparatus to perform the method of Aspect 24.

Aspect 46: A device for wireless communication, comprising a memory and one or more processors coupled to the memory, the one or more processors configured to perform the method of Aspect 24.

Aspect 47: An apparatus for wireless communication, comprising at least one means for performing the method of Aspect 24.

Aspect 48: A non-transitory computer-readable medium storing code for wireless communication, the code comprising instructions executable by a processor to perform the method of Aspect 24.

Aspect 49: A non-transitory computer-readable medium storing a set of instructions for wireless communication, the set of instructions comprising one or more instructions that, when executed by one or more processors of a device, cause the device to perform the method of Aspect 24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
at least one transceiver;
at least one memory comprising instructions; and
one or more processors configured to execute the instructions to cause the UE to:
receive, via the at least one transceiver, a first synchronization signal/physical broadcast channel (SS/PBCH) block;
receive, via the at least one transceiver, a second SS/PBCH block;
receive, via the at least one transceiver, an indication of a time gap in a system information block;
determine, based at least in part on the time gap between the first SS/PBCH block and the second SS/PBCH block, that the first SS/PBCH block and the second SS/PBCH block are included in an SS/PBCH block group; and
determine an SS/PBCH block group index, associated with the SS/PBCH block group, based at least in part on a first SS/PBCH block index associated with the first SS/PBCH block and a second SS/PBCH block index associated with the second SS/PBCH block.

2. The UE of claim 1, wherein the time gap is less than half of an SS/PBCH burst periodicity.

3. The UE of claim 1, wherein the time gap is based on a wireless communication standard.

4. The UE of claim 1, wherein the one or more processors, when determining the SS/PBCH block group index, are configured to cause the UE to concatenate a set of bits corresponding to the first SS/PBCH block index and a set of bits corresponding to the second SS/PBCH block index.

5. A base station, comprising:
at least one transceiver;
at least one memory comprising instructions; and
one or more processors configured to execute the instructions to cause the base station to:
transmit, via the at least one transceiver, a first synchronization signal/physical broadcast channel (SS/PBCH) block of an SS/PBCH block group, the first SS/PBCH block indicating a first SS/PBCH block index;
transmit, via the at least one transceiver, a second SS/PBCH block of the SS/PBCH block group, the second SS/PBCH block indicating a second SS/PBCH block index;
transmit, via the at least one transceiver, an indication of a time gap in a system information block,
wherein the time gap between the first SS/PBCH block and the second SS/PBCH block indicates that the first SS/PBCH block and the second SS/PBCH block are included in the SS/PBCH block group, and
wherein an SS/PBCH block group index associated with the SS/PBCH block group is indicated via the first SS/PBCH block index and the second SS/PBCH block index.

6. The base station of claim 5, wherein the time gap is less than half of an SS/PBCH burst periodicity.

7. The base station of claim 5, wherein the one or more processors are further configured to cause the base station to configure the time gap according to a wireless communication standard.

8. A user equipment (UE), comprising:
at least one transceiver;
at least one memory comprising instructions; and
one or more processors configured to execute the instructions to cause the UE to:
receive, via the at least one transceiver, a first synchronization signal/physical broadcast channel (SS/PBCH) block;
receive, via the at least one transceiver, a second SS/PBCH block;
determine, based at least in part on a time gap between the first SS/PBCH block and the second SS/PBCH block, that the first SS/PBCH block and the second SS/PBCH block are included in an SS/PBCH block group, wherein the time gap is less than half of an SS/PBCH burst periodicity; and
determine an SS/PBCH block group index, associated with the SS/PBCH block group, based at least in part on a first SS/PBCH block index associated with the first SS/PBCH block and a second SS/PBCH block index associated with the second SS/PBCH block.

9. The UE of claim 8, wherein the time gap is configured according to a wireless communication standard.

10. The UE of claim 8, wherein the one or more processors are further configured to cause the UE to receive, via the at least one transceiver, an indication of the time gap in a system information block.

11. The UE of claim 8, wherein the one or more processors, when determining the SS/PBCH block group index, are configured to concatenate a set of bits corresponding to the first SS/PBCH block index and a set of bits corresponding to the second SS/PBCH block index.

12. A user equipment (UE), comprising:
at least one transceiver;
at least one memory comprising instructions; and
one or more processors configured to execute the instructions to cause the UE to:
receive, via the at least one transceiver, a first synchronization signal/physical broadcast channel (SS/PBCH) block;

receive, via the at least one transceiver, a second SS/PBCH block;

determine, based at least in part on a time gap between the first SS/PBCH block and the second SS/PBCH block, that the first SS/PBCH block and the second SS/PBCH block are included in an SS/PBCH block group; and determine an SS/PBCH block group index, associated with the SS/PBCH block group, based at least in part on a first SS/PBCH block index associated with the first SS/PBCH block and a second SS/PBCH block index associated with the second SS/PBCH block, wherein the one or more processors, when determining the SS/PBCH block group index, are configured to cause the UE to concatenate a set of bits corresponding to the first SS/PBCH block index and a set of bits corresponding to the second SS/PBCH block index.

13. The UE of claim 12, wherein the time gap is less than half of an SS/PBCH burst periodicity.

14. The UE of claim 12, wherein the time gap is configured according to a wireless communication standard.

15. The UE of claim 12, wherein the one or more processors are further configured to cause the UE to receive, via the at least one transceiver, an indication of the time gap in a system information block.

16. A base station, comprising:

at least one transceiver;

at least one memory comprising instructions; and one or more processors configured to execute the instructions to cause the base station to:

transmit, via the at least one transceiver, a first synchronization signal/physical broadcast channel (SS/PBCH) block of an SS/PBCH block group, the first SS/PBCH block indicating a first SS/PBCH block index;

transmit, via the at least one transceiver, a second SS/PBCH block of the SS/PBCH block group, the second SS/PBCH block indicating a second SS/PBCH block index, wherein a time gap between the first SS/PBCH block and the second SS/PBCH block indicates that the first SS/PBCH block and the second SS/PBCH block are included in the SS/PBCH block group, wherein an SS/PBCH block group index associated with the SS/PBCH block group is indicated via the first SS/PBCH block index and the second SS/PBCH block index, and wherein the time gap is less than half of an SS/PBCH burst periodicity.

17. The base station of claim 16, wherein the one or more processors are further configured to cause the base station to configure the time gap according to a wireless communication standard.

18. The base station of claim 16, wherein the one or more processors are further configured to cause the base station to transmit, via the at least one transceiver, an indication of the time gap in a system information block.

* * * * *